United States Patent [19]

Ohmae et al.

[11] 4,174,645
[45] Nov. 20, 1979

[54] AUTOMATIC CHANGE-GEAR CONTROL DEVICE FOR USE IN ELECTROMOBILE

[75] Inventors: Tsutomu Ohmae; Katsuji Marumoto, both of Hitachi, Japan

[73] Assignee: The Agency of Industrial Science and Technology, Tokyo, Japan

[21] Appl. No.: 743,657

[22] Filed: Nov. 22, 1976

[30] Foreign Application Priority Data

Nov. 29, 1975 [JP] Japan .................. 50-141836

[51] Int. Cl.² .......................................... B60K 41/04
[52] U.S. Cl. ........................ 74/866; 180/65 R; 318/139
[58] Field of Search ............... 74/863, 864, 865, 866, 74/857, 856, 859, 860; 180/65 R

[56] References Cited

U.S. PATENT DOCUMENTS

| | | | |
|---|---|---|---|
| 3,628,621 | 12/1971 | Lee | 180/65 R |
| 3,684,066 | 8/1972 | Kubo et al. | 74/866 X |
| 3,726,159 | 4/1973 | Mizote | 74/866 |
| 3,732,755 | 5/1973 | Beig et al. | 74/866 |
| 3,747,438 | 7/1973 | Toyoda et al. | 74/866 |
| 3,794,133 | 2/1974 | Sugiura et al. | 74/866 X |
| 3,898,893 | 8/1975 | Hashimoto et al. | 74/859 |
| 4,021,712 | 5/1977 | Ishihara et al. | 74/866 X |

Primary Examiner—Samuel Scott
Assistant Examiner—Carl F. Pietruszka
Attorney, Agent, or Firm—Thomas E. Beall, Jr.

[57] ABSTRACT

An automatic change-gear control device for use in an electromobile which incorporates a multi-stage change gear drive system. This automatic change gear control device selects and controls a gear ratio for an optimum ratio, depending on the running condition of a vehicle, and particularly provides a change-gear logic by detecting a load torque for every individual condition, in an attempt to improve the running performance of a vehicle at the time of acceleration or at the time of running on an upward slope.

2 Claims, 6 Drawing Figures

4,174,645

AUTOMATIC CHANGE-GEAR CONTROL DEVICE FOR USE IN ELECTROMOBILE

BACKGROUND OF THE INVENTION

This invention relates to an automatic change gear control device for use in an electromobile.

According to a prior art automatic change gear control device for use in an electromobile, a running condition is determined, based on both a vehicle speed and an output torque of an electric motor, for selecting a gear ratio, so that gear-changing may be made due to the gear ratio thus selected, automatically. In general, when an output torque of an electric motor is increased, with a vehicle speed maintained below a given value, then gears are changed to a large gear ratio.

Included by the cases where an output torque of an electric motor is increased are acceleration during the running on a flat road and a running on an upward slope under an increased load.

However, the prior art change gear control device uses a common output torque of an electric motor, irrespective of the aforesaid classification, thus failing to achieve optimum gear changing, and tends to change gears when the gear changing is not required.

More particularly, with the prior art change gear control device, acceleration may be achieved with ease during the running of a vehicle on a flat road, and this requires frequent changing of gears. This however is not preferable from a viewpoint of drive-feeling. On the other hand, it is desired that upon transition to the running of a vehicle on an upward slope, a large gear ratio be selected rapidly.

In addition, from viewpoints of a total efficiency, it is desired that an electromobile be run at as low r.p.m. of an electric motor, i.e., at as low gear ratio as possible, for minimizing a loss due to rotation of gears.

SUMMARY OF THE INVENTION

It is an object of the present invention to provide an automatic change gear control device for use in an electromobile, which avoids the shortcomings in the prior art control device of this type, and which may provide a desired drive-feeling and total efficiency.

According to the present invention, there is provided an automatic change gear control device for use in an electromobile, in which an output torque of an electric motor and a vehicle speed are detected, and then the detected outputs are divided into a load torque and an acceleration torque. Then, a change gear pattern is established by using values of these torques and vehicle speed, thereby selecting an optimum gear ratio for every running condition of a vehicle.

DESCRIPTION OF THE PREFERRED EMBODIMENTS

Figure 1:
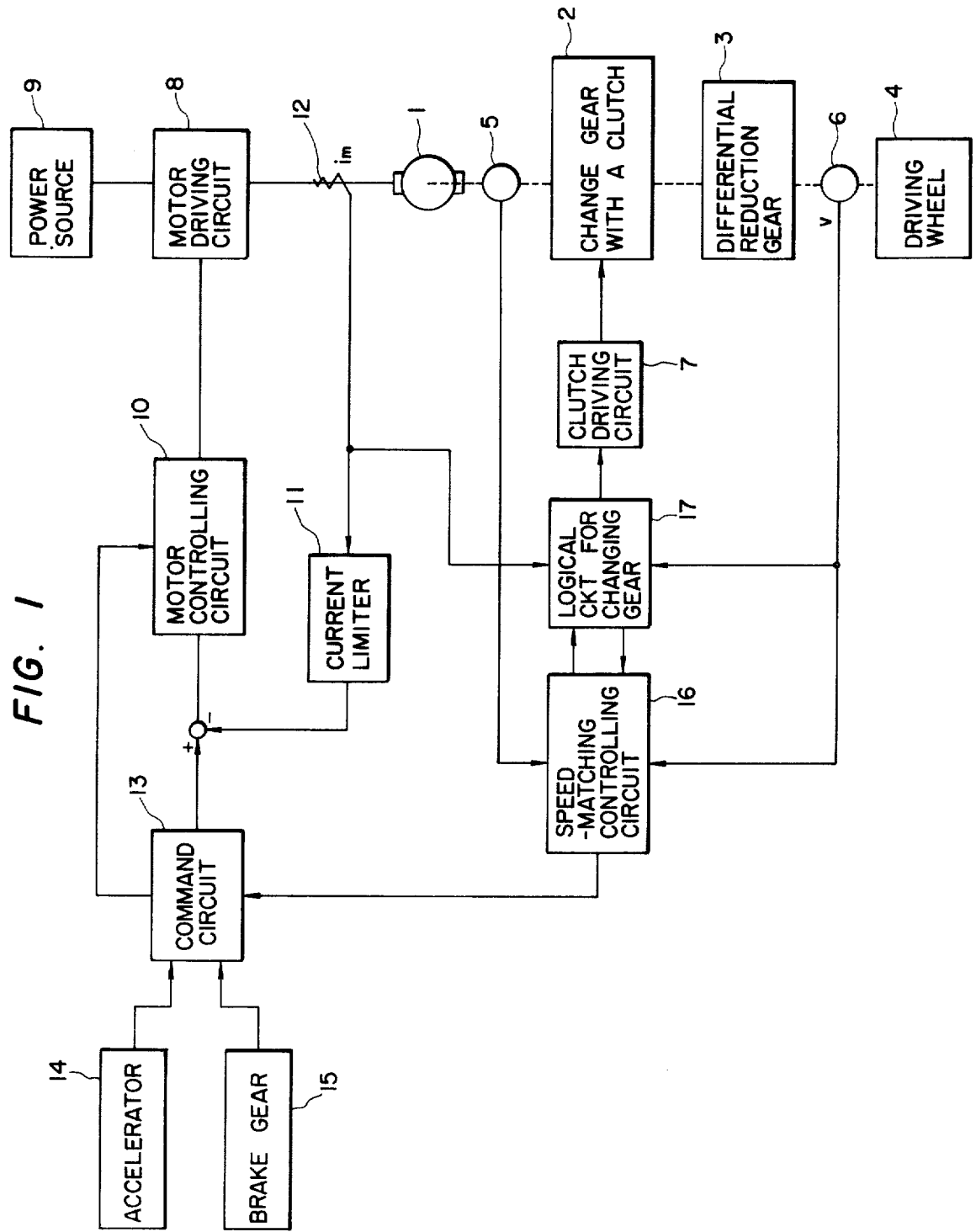
FIG. 1 is a block diagram showing a typical change gear control device according to the invention.

The aforesaid object and features of the present invention will be apparent from a reading of the ensuing part of the specification in conjunction with the accompanying drawings which indicate an embodiment of the invention. Referring to FIG. 1, shown at 1 is an electric motor adapted to drive an electromobile. In this respect, it is assumed that a magnetic field is constant and a torque is proportional to an armature current. Shown at 2 is a change gear with a clutch, which consists of a clutch and gears, at 3 a differential reduction gear, at 4 a driving wheel; at 5 a device for detecting the r.p.m. of an output shaft of an electric motor, at 6 a speed detecting device for detecting the speed of an electromobile, at 7 a clutch driving circuit for driving an electromagnetic solenoid or a hydraulic electromagnetic valve or the like, which is built in the change gear with a clutch 2, at 9 power source consisting of a battery or the like, at 10 a motor controlling circuit for switching the operational mode of the motor driving circuit 8 from one mode to another, according to a command designating a mode such as forward and backward running, heavy load running, and braking, and further controlling a current conducting rate of the motor driving circuit 8, at 11 a current limiter for controlling a maximum value of an armature current according to an output of an armature-current detector 12, at 13 a command circuit for issuing an operational mode and speed commands according to an output signal from an accelerator 14 and a brake gear 15 as well as to an output signal from speed-matching controlling circuit 16, the aforesaid output signal being issued, commensurate with an extent of an accelerating pedal and a brake pedal being trodden, and at 17 a logical circuit for changing gears for selecting among gear ratios, and opening and closing the clutch, commensurate with an output of the armature current detector 12 and an output of the speed detecting device 6.

With the aforesaid arrangement, the change gear with a clutch 2 maintains the clutch in a closed condition during an ordinary running of a vehicle, thereby transmitting a torque of an electric motor to the driving wheel 4. At the time of stoppage of a vehicle, a gear ratio is maintained at the maximum. When the accelerating pedal is trodden during the normal running of a vehicle, then an output is produced at the accelerator 14, so that an operational mode of the heavy load running is instructed through the command circuit 13. As a result, a current flows to the electric motor 1 by way of the motor controlling circuit 10, and motor driving circuit 8, with the result that a torque is increased and hence the speed of a vehicle is raised. Meanwhile, when an optimum gear ratio is selected in the logical circuit 17 for changing gears, based on a vehicle speed and armature current, so as to change gear ratio, then an electromagnetic clutch is brought to its open position by the clutch driving circuit 7, and then an electric motor is controlled for a r.p.m. suited for a gear ratio to be changed by the speed-matching controlling circuit 16. Thus, when the electric motor is controlled to the aforesaid r.p.m., the electromagnetic clutch is brought to its closed position by the clutch driving circuit 7. Thereby, a gear ratio is changed automatically so as to provide an optimum gear ratio. As is clear from this, the feature of the present invention lies in the provision of a logical circuit for changing gears for selecting an optimum gear ratio by using an armature current and a vehicle speed.

Assume an output torque $\tau_m$ of an electric motor for driving an electromobile, a vehicle speed v, and a gear ratio $\epsilon$. Then the following relationship among these may be established:

$$M \cdot (dv/dt) = \epsilon \cdot \tau_m - a - b \cdot v^2 \quad (1)$$

wherein a represents a constant dependent on the type of a vehicle and a condition of a road surface, b a constant dependent on the type of a vehicle, and M an inertia constant of a vehicle.

A load torque $\tau_l$ may be obtained from the equation (1), as follows:

$$\tau_l = a + b \cdot v^2 \quad (2)$$

From the equations (1), (2), a load torque $\tau_l$ may be expressed as follows, by using a variation dv/dt of a vehicle speed and an output torque $\tau_m$ of a electric motor:

$$\tau_l = \epsilon \cdot \tau_m - M \cdot (dv/dt) \quad (3)$$

A torque $\tau_a$ required for acceleration is a torque corresponding to a variation in vehicle speed, so that the following equation may be given:

$$\tau_a = M \cdot (dv/dt) \quad (4)$$

In this manner, the change in vehicle speed and output torque of the electric motor is measured and these values are used to calculate a load torque $\tau_l$ and an acceleration torque $\tau_a$, so that the surface condition of a road during the running of a vehicle may be detected as the load torque $\tau_l$, thereby enabling the selection of an optimum gear ratio.

Figure 2:
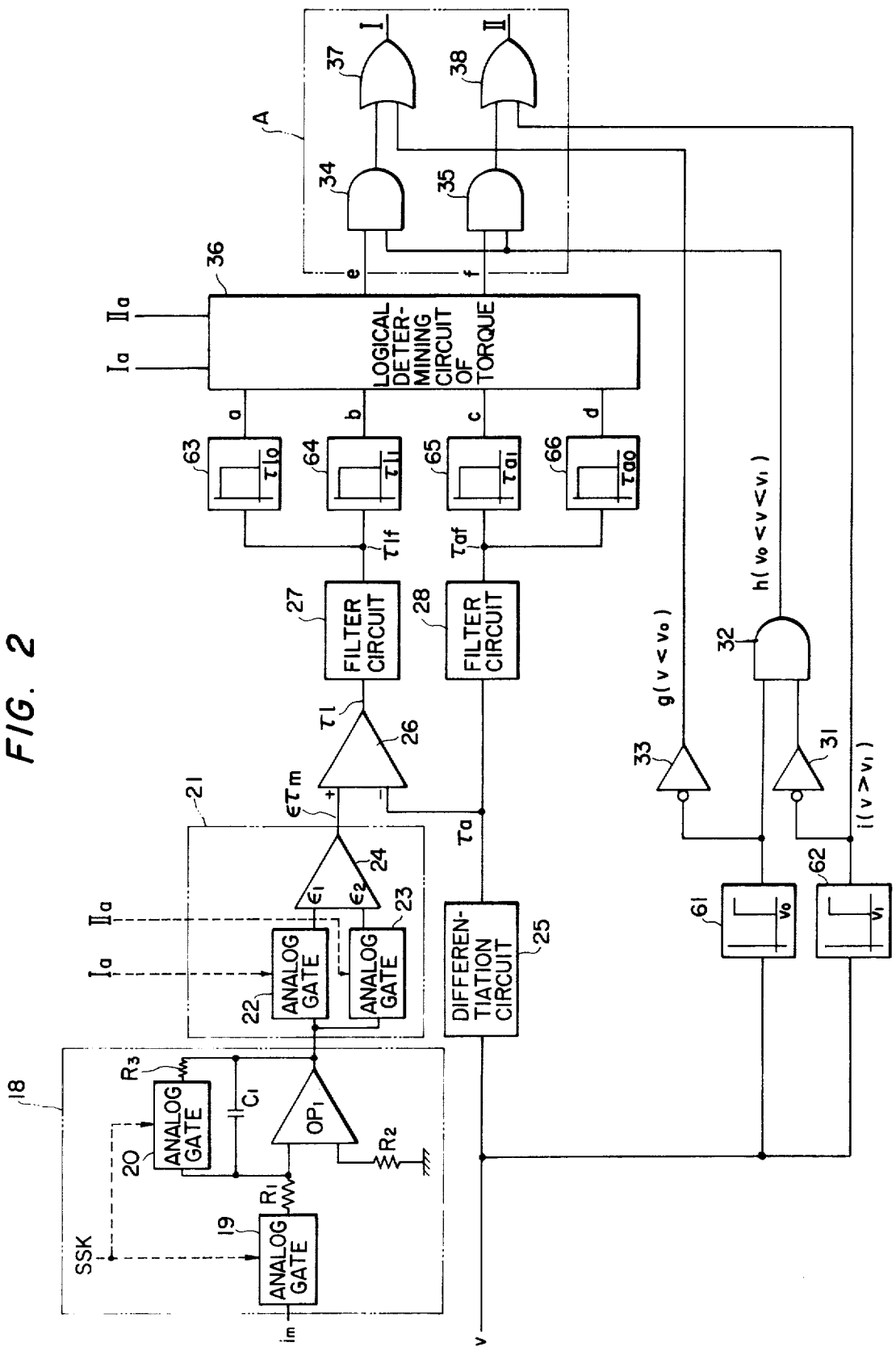
FIG. 2 is a circuit diagram showing one embodiment of a change gear logic circuit as used in FIG. 1.

Description will be given of one embodiment of the logical circuit for changing gears, which selects an optimum gear ratio, with reference to FIG. 2. FIG. 2 shows the logical circuit 17 for the first speed and the second speed. Shown at 18 is a motor torque detector, which consists of analog gates 19, 20, resistors R1, R2, R3, a condenser C1, and operational amplifier OP1. Shown at 21 is a calculating circuit of an output torque consisting of analog gates 22, 23 and a multiplying circuit 24. An output signal from detector 12 correlated to the electric motor current im and thus correlated to the torque of the electric motor under load, maintains its value obtained prior to the changing of gears during the actual changing of gears; during the changing of gears, the motor will not be connected to the load and the motor current im may change to correspondingly control the speed of the motor without having any affect upon the motor torque signal maintained in the motor torque detector 18. Thereby, the motor torque required to operate the vehicle may be accurately detected for every operational condition. In other words, during the changing of gears, a signal is developed at a terminal SSK, and the analog gates 19, 20 are kept open. As a result, charges stored in the condenser C1 are retained, with the result that an electric motor torque constantly supplied to a load during the changing of gears may be accurately detected. The value thus detected is taken as an input signal of the calculating circuit for an output torque, and then the torque is multiplied by a gain $\epsilon_1$ corresponding to a gear ratio at the first speed, or a gain $\epsilon_2$ corresponding to the gear ratio at the second speed. Then, $\epsilon \cdot \tau_m$ shown in the equation (3) is calculated. On the other hand, the vehicle speed v is differentiated by the differentiation circuit 25, and calculation is given according to the equation (4) for obtaining an acceleration torque $\tau_a$. Acceleration torque output signal $\tau_a$ from differentiation circuit 25 is subtracted in circuit 26 from the $\epsilon \cdot \tau_m$ signal to obtain a load torque $\tau_l$. The load torque $\tau_l$ is smoothened through a filter 27 consisting of a primary lagging circuit having a gain of 1, while an acceleration torque $\tau_a$ is smoothened through another filter 28 consisting of the primary lagging circuit having a gain of 1. These filters 27, 28 suppress an abrupt change in the load torque $\tau_l$ and acceleration torque $\tau_a$. Gear changing is carried out by using outputs $\tau_{lf}$, $\tau_{af}$ of the filters 27, 28 in a change gear region shown in FIG. 3.

In case the vehicle speed v is below a speed v0, then an output of comparator 61 becomes zero, (Low level logical signal is referred to as 0, and a logical signal of a high level is referred to as 1, hereinafter.), and the outputs of AND circuits 32, 34, 35 all become zero. In addition, an output 1 of comparator 62, as well, becomes zero. As a result, an output of an OR circuit 38, which represents a running region of the second speed becomes zero. On the other hand, an output of the NOT circuit 33 becomes one, and the output of OR circuit 37 becomes 1. This represents the running of a vehicle at the first speed. This region is provided so as to achieve satisfactory stable running of an electromobile, by minimizing changing of gears, when a vehicle speed is low. Thus, it is seen that when the vehicle speed is below the speed v0, the first gear I is always chosen regardless of the output of the logical determining circuit of torque 36, as illustrated in FIG. 3.

When the vehicle speed v exceeds v1, then the outputs of the comparators 61, 62 both become 1. Accordingly, an output of the NOT circuit 33 becomes zero, an output h of the AND circuit 32 remains at zero, the output of NOT circuit 31 becomes zero, an output of the OR circuit 37 becomes zero, and an output of the OR circuit 38 becomes 1. This represents the running of a vehicle at the second speed. This region is provided for the running of a vehicle, which lowers a gear ratio for higher speed running, when the r.p.m. of an electric motor reaches the maximum at the first speed gear ratio. Thus, it is seen that when the vehicle speed is greater than v1, the gear ratio II is always chosen regardless of the motor torque or output of the logical determining circuit of torque, which is shown in FIG. 3.

When the vehicle speed is between v0 and v1, the changing of gears to the first gear I or to the second gear II or the maintaining of the existing gear ratio is carried out according to the values of the load torque $\tau_l$ and the acceleration torque $\tau_a$. The logical determining circuit of torque 36 as shown in FIG. 2, and as shown in more detail in FIG. 5, will determine the selection of gear ratio within the range of vehicle speed between v0 and v1, as described below. Comparator 63 normally provides a logic output of 1 to the input a until the load torque $\tau_l$ exceeds a fixed value $\tau_{l0}$, at which time the logic output becomes zero. The logic output of comparator 64 is one for the input b until the load torque $\tau_l$ exceeds a fixed value $\tau_{l1}$, at which time it becomes zero. The logic output of comparator 65 fed to input c is one until the acceleration torque $\tau_a$ exceeds a fixed value $\tau_{a1}$, at which time it becomes zero. The logic output of comparator 66 is one and is provided at input d until the acceleration torque $\tau_a$ exceeds a fixed value $\tau_{a0}$, at which time it becomes zero. Whenever the acceleration torque $\tau_a$ exceeds the fixed value $\tau_{a1}$ inputs c and d will be zero, so that output of AND gate 39 will be zero, output of AND gate 41 will be zero (with both these outputs at zero, the outputs of AND gate 44 and OR gate 47 will be zero so that gear ratio II will not be selected), and output of the inverter 43 will be 1 to produce outputs of 1 for both of the OR gates 46 and 48 to select the gear ratio I; which condition is shown in FIG. 4 to the right of the vertical line representing the acceleration torque $\tau_{a1}$. Similarily, it is seen that when the load torque exceeds the fixed value $\tau_{l1}$, input signals a and b will be zero to again select only the gear ratio I through the inverter 42, OR gate 46, and OR gate 48; this condition is shown in FIG. 4 above the horizontal line representing the load torque value $\tau_{l1}$. If acceleration torque is less than $\tau_{a0}$ at the same time that load torque is less than $\tau_{l0}$, then inputs a–d will all be 0 so that the output of AND gate 39 will be 1 to select the gear ratio II through OR gate 47 as depicted in the lower left-hand corner of FIG. 4; this condition is also represented in FIG. 3 between speeds V0 and V1 where the gear ratio II is selected when the motor torque is below the horizontal line $\tau_{l0}$ and may be selected when the motor torque is below the line $\tau_{a0}+\tau_{l0}$. As can be determined from FIG. 5, and as depicted in the single-cross hatch area of FIG. 4, the remaining conditions of the inputs a, b, c, d will result in the existing gear ratio being maintained; under these conditions, at least one of the inputs a or d will be 0, which will result in the output of 39 being 0 and the output of 40 being 1; also both of the inputs b and c will be one, which will result in the outputs of 42, 43 and 46 all being 0 and the output of 41 being 1 so that input Ia will determine the first gear ratio I and the input II will maintain the gear ratio II.

Figure 3:
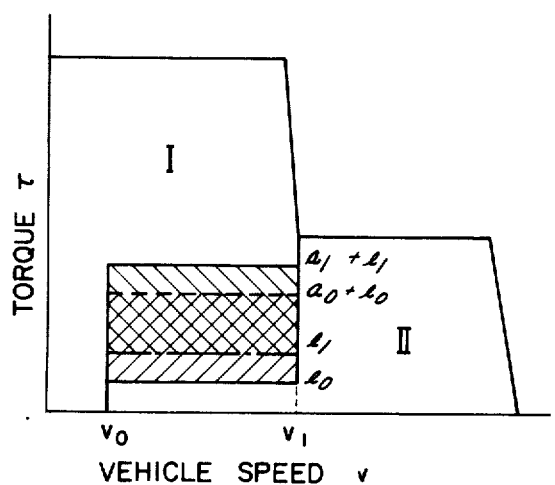
FIG. 3 is a plot showing characteristics of change gear regions for illustrating the operation of a circuit of FIG. 2.
Figure 4:
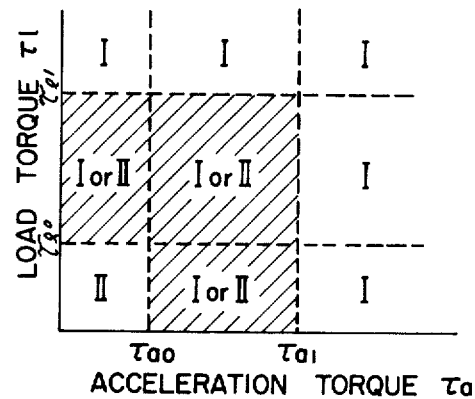
FIG. 4 is a plot showing characteristics of operation of a logical determining circuit of torque.

In FIG. 3, the motor torque (a combination of acceleration torque and load torque) is plotted with respect to vehicle speed, and it is assumed that $\tau_{a0}$ is the same as or greater than $\tau_{l0}$, and that $\tau_{a1}$ is the same as or greater than $\tau_{l1}$. In the cross hatched area, the lower horizontal line is at a torque equal $\tau_{l0}$ and moving upwardly, the next horizontal line is at a torque equal to $\tau_{l1}$, the next line is at a torque equal to the torque $\tau_{a0}$ plus $\tau_{l0}$, and the top horizontal line is at a torque equal to $\tau_{a1}$ plus $\tau_{l1}$. From FIG. 4, it is seen that if the total torque is between the quantity ($\tau_{a0}$ plus $\tau_{l0}$) and $\tau_{l0}$, as shown by cross hatching in one direction in FIG. 3, this system may or may not be in the mandatory gear ratio II area, whereas below the line $\tau_{l0}$ in FIG. 3 gear ratio II must be selected. Similarly, if the total torque is greater than the value ($\tau_{a1}$ plus $\tau_{l1}$) then gear one must be selected, whereas if the total torque is between such value and the value $\tau_{l1}$, the system may or may not be in the area of requiring the selection of gear ratio I.

Figure 5:
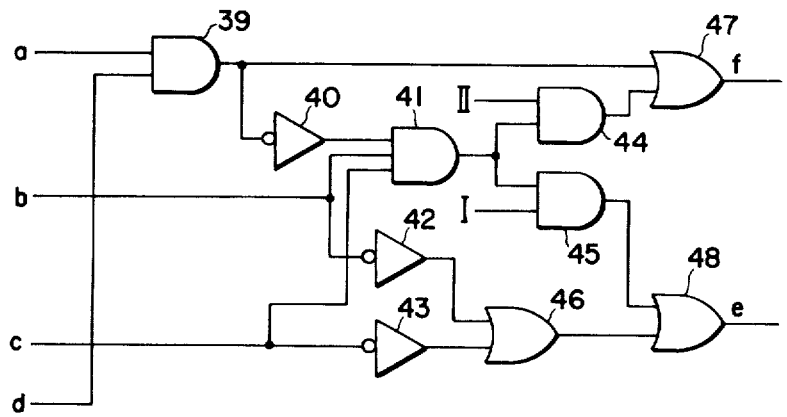
FIG. 5 is a circuit diagram showing one embodiment of the logical determining circuit of torque, of FIG. 2.

FIG. 4 signifies that, when the torque of a vehicle moves from the first gear ratio I region into the hatched region shown in FIG. 4, the first gear ratio is selected, and when the torque of the vehicle moves from the second gear ratio II region into this hatched region, then the second gear ratio is selected. FIG. 5 shows one embodiment of the logical determining circuit 36 of torque for making determination as shown in FIG. 4.

As is clear from the foregoing, the logical circuit 17 for changing gears functions or determines such that efficient running of a vehicle may be achieved by maintaining the r.p.m. of an electric motor at a low value, due to a reduced gear ratio II on light-load running, and that when a load is increased upon running on an upward slope, or when a vehicle is accelerated by treading an accelerator pedal, gears are changed to a large gear ratio I.

According to the embodiment shown in FIG. 2, gears are changed by detecting acceleration and output torque of the electric motor and using these detected values to calculate the acceleration torque and the load torque $\tau_l$, so that an optimum changing of gears may be achieved by separately selecting the time constants of the filters 27, 28 as well as setting the values of comparing levels of the comparators 63, 64, 65, 66.

For instance, when an upper limit $\tau_{a1}$ of a comparing level for an acceleration torque $\tau_a$ is larger than an upper limit $\tau_{l1}$ of a comparing level for the load torque $\tau_l$, then gear changing to gear ratio I will not take place due to a delicate variation in extent of an accelerator pedal being trodden that would cause a corresponding increase in acceleration torque that would make the acceleration torque value exceed the load torque value $\tau_l$ but not exceed the acceleration torque value a1. In addition, since an upper limit $\tau_{l1}$ of a comparing level for a heavy load torque required for the running of a vehicle on an upward slope is small in comparison to the acceleration torque value a1, when the mode of running is shifted from the flat road to the upward slope running, gears may be changed to a larger gear ratio relatively quickly, thus enabling the changing of gears to produce a large output torque. While it was noted above that it is preferable to establish the acceleration torque limit $\tau_{a1}$ higher than would ordinarily be needed for efficient operation so as to remove instability with respect to momentary or brief accelerations, no such considerations apply with respect to establishing the lower torque values, that is, $\tau_{a0}$ and $\tau_{l0}$, and these lower values may therefore be set only taking into consideration the most efficient correlation between torque and motor speeds, with it being recognized that it is desirable to maintain the electric motor speed as small as possible under these circumstances.

On the other hand, when a time constant of the filter 27 on the side of a load torque is shorter than that of the filter 28 on the side of an acceleration torque, then relatively quick changing of gears results upon running of a vehicle on an upward slope, while a stable operation may be achieved due to dull or lowered sensitivity, i.e., slow response to a value, such as acceleration torque, which frequently varies depending on an accelerator opening.

Figure 6:
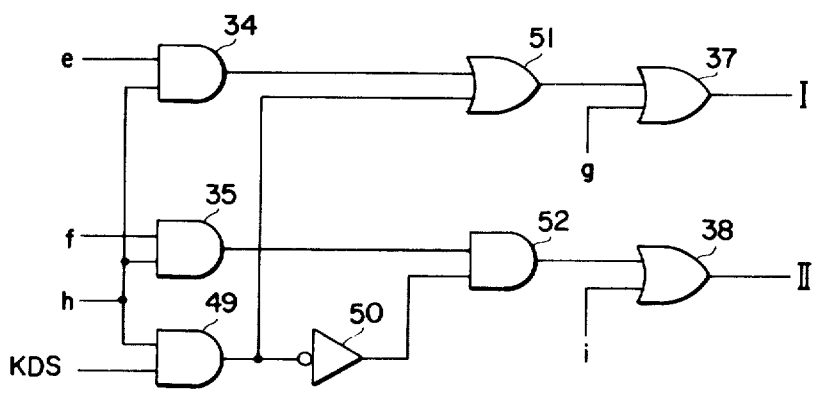
FIG. 6 is a circuit diagram showing another embodiment of the gear-changing logical circuit according to the invention.

Meanwhile, the logical determining circuit for changing gears as shown in FIG. 2 detects an increase in a load torque and acceleration torque by detecting the fact that an armature current flows therethrough, thereby changing gears to a large gear ratio. As a result, gear changing is delayed because of an uprising time of current and time constants of filters, with the result that quick changing of gears from a certain vehicle speed is delayed, thus posing problems for a specific type electromobiles. To cope with this, the logical circuit shown in FIG. 6 is proposed. A portion A encompassed with broken lines is replaced by the circuit shown in FIG. 6, the other circuits remaining unchanged, as compared with those shown in FIG. 2.

Suppose that the vehicle speed v is between v0 and v1, and yet a vehicle runs at the second speed gear ratio, then signals h and f remain at 1, while the signal e remains at zero. Under the above condition, in case an accelerator pedal is trodden to its maximum during running of a vehicle, then a kick-down signal KDS becomes 1. In this respect, the signal KDS is a signal which issues an output, when an accelerator pedal is trodden to a given extent, with a limit switch mounted on an accelerator pedal or a acceleration device. When the kick-down signal becomes 1, then signal h remains at 1, so that an output of the AND circuit 49 becomes 1. As a result, a signal representing the first speed is issued by way of the OR circuits 51, 37. On the other hand, an output of the AND circuit 49 is inverted in the NOT circuit 50, thereby bringing an output of the AND circuit 52 to zero. As a result, an output of the OR circuit 38, as well, becomes zero, thereby releasing the second speed gear ratio. Meanwhile, when the speed of a vehicle is out of a range between v0 and v1, then h=0, so that an output of the AND circuit 49 is maintained at zero, providing no connection with the signal KDS. In this manner, when an extent of the accelerator pedal being trodden is over a given value, gears may be changed to a large gear ratio to increase an acceleration torque, irrespective of an output of the logical determining circuit 36 according to the kick-down signal KDS. As a result, quick acceleration may be enabled, improving the function of an automatic change-gear control device according to the invention.

As is apparent from the foregoing description of the automatic change-gear device according to the present invention, an output torque may be divided into a torque required for acceleration and a load torque dependent on the condition of an existing road surface, so that a gear position is determined by using these acceleration torque and load torque, thereby providing an optimum gear ratio for every running condition of a vehicle.

Meanwhile, in the embodiment of FIG. 2, acceleration torque is calculated from a vehicle speed. However, it is apparent that an acceleration torque may be calculated by using the r.p.m. of an electric motor. While description has been given thus far of the two-stage change gear device by way of an example, the same description may go for the three or more stage change gear device.

What is claimed is:

1. In an vehicle having an inertia characteristic and being driven by an motor, which includes means for detecting an output torque of said motor and producing a correlated motor torque signal, means for detecting a vehicle speed of said electromobile and producing a correlated vehicle speed signal, and a control device for automatically controlling a gear position of a change gear device according to a gear-changing pattern having at least a small gear ratio and a large gear ratio, commensurate with the output torque and the vehicle speed thus detected, and means for detecting the selected gear and producing a correlated gear ratio signal; an automatic change gear control device, comprising:

means for obtaining a vehicle output torque signal from said motor torque signal and said gear ratio signal;

means differentiating said vehicle speed signal with respect to time for obtaining an acceleration torque signal from the variation in vehicle speed signal and the vehicle inertia characteristic;

operational means for obtaining a load torque signal from a difference between said vehicle torque signal and said acceleration torque signal;

means setting a fixed upper acceleration torque limit signal;

means setting a fixed lower acceleration torque signal;

means setting a fixed upper load torque limit signal;

means setting a fixed lower load torque limit signal;

means selecting the small gear ratio when said load torque signal and said acceleration torque signal are both below their lower limit signals;

means selecting the large gear ratio when either one of said load and acceleration torque signals is larger than its upper limit signal; and means maintaining the selected gear ratio when said load torque signal and said acceleration torque signal are both below their upper limit signals, and when either one of said load and acceleration torque signals is larger than its lower limit signal.

2. The vehicle according to claim 1, including means setting a fixed upper vehicle speed limit signal;

means setting a fixed lower vehicle speed limit signal;

means overriding said selecting means and said maintaining means for assuring that the small gear ratio is selected whenever the vehicle speed signal is larger than the upper vehicle speed limit signal and for assuring that the large gear ratio is selected whenever the vehicle speed signal is lower than the lower vehicle speed limit signal.

* * * * *